US012661982B2

(12) United States Patent
Bradley

(10) Patent No.: US 12,661,982 B2
(45) Date of Patent: Jun. 23, 2026

(54) APPARATUS AND METHOD FOR PROVIDING REAL-TIME VEHICLE DATA CAPTURE AND VEHICLE IDENTIFICATION

(71) Applicant: DeAnjelo Bradley, Oklahoma City, OK (US)

(72) Inventor: DeAnjelo Bradley, Oklahoma City, OK (US)

( * ) Notice: Subject to any disclaimer, the term of this patent is extended or adjusted under 35 U.S.C. 154(b) by 66 days.

(21) Appl. No.: 18/084,098

(22) Filed: Dec. 19, 2022

(65) Prior Publication Data

US 2024/0198799 A1 Jun. 20, 2024

(51) Int. Cl.
| | |
|---|---|
| *G08B 21/00* | (2006.01) |
| *B60K 35/00* | (2006.01) |
| *B60K 35/60* | (2024.01) |
| *G06V 20/56* | (2022.01) |
| *B60K 35/22* | (2024.01) |
| *B60K 35/28* | (2024.01) |

(52) U.S. Cl.
CPC .............. *B60K 35/00* (2013.01); *B60K 35/60* (2024.01); *G06V 20/56* (2022.01); *B60K 35/22* (2024.01); *B60K 35/28* (2024.01); *B60K 2360/176* (2024.01); *B60K 2360/21* (2024.01); *B60K 2360/794* (2024.01)

(58) Field of Classification Search
CPC ........ B60K 35/00; B60K 35/22; B60K 35/28; B60K 35/60; B60K 2360/176; B60K 2360/21; B60K 2360/794; G06V 20/56
USPC ...................................... 340/425.5
See application file for complete search history.

(56) References Cited

U.S. PATENT DOCUMENTS

| | | | |
|---|---|---|---|
| 11,616,932 B1 * | 3/2023 | Xu ........................... | H04W 4/38 |
| | | | 348/207.99 |
| 2007/0076526 A1 * | 4/2007 | Aikyo ..................... | G01S 15/86 |
| | | | 367/128 |
| 2014/0285337 A1 * | 9/2014 | Gebhardt ............. | G07C 5/0866 |
| | | | 340/521 |
| 2017/0200333 A1 * | 7/2017 | Plante .................... | G07C 5/085 |
| 2022/0237996 A1 * | 7/2022 | Hodge ............. | G08B 13/19645 |

FOREIGN PATENT DOCUMENTS

WO      WO-2018230704 A1 * 12/2018    ........... G05D 1/0088

* cited by examiner

*Primary Examiner* — Mark S Rushing
(74) *Attorney, Agent, or Firm* — Kimberly McLean

(57) ABSTRACT

An apparatus and method for providing real-time vehicle data capture and vehicle identification. The apparatus includes an identification and data capture system, a network, a vehicle management server, at least one guardian angel device and at least one data storage device. The identification and data capture system includes, a display device, a media recording unit, at least one trigger unit, at least one computer-readable storage media and at least one processor. The display device is configured on an external surface of a vehicle door. The media recording unit is configured to capture data in real-time. The at least one trigger unit is configured to initiate a real-time data capturing by the media recording unit. The at least one computer-readable storage media stores a guardian angel application which is executed by the at least one processor.

14 Claims, 5 Drawing Sheets

100

<u>140</u>

<u>180</u>

Trigger Event Occurs — 410

Alert VMS and GADs — 420

Activate video recording device(s) — 430

Stream data from video recording device(s) to VMS — 440

Broadcast data to GADs — 450

400

510

520

500

APPARATUS AND METHOD FOR PROVIDING REAL-TIME VEHICLE DATA CAPTURE AND VEHICLE IDENTIFICATION

FIELD OF THE INVENTION

Embodiments described herein generally relate to data capture and identification systems, and more particularly to a vehicle identification and real-time data capture apparatus and method.

BACKGROUND OF THE INVENTION

Oftentimes, vehicle operators may encounter an emergency event, such as, an accident, an encounter with the police or a bystander, or a medical event. In these instances, it can be very helpful if real-time data related to the event is captured and provided to other entities, such as, emergency contacts, hospitals, third party monitoring services, etc. Hence, a way to capture real-time data and provide vehicle information is desirable.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably. The various advantages of the embodiments of the present disclosure will become apparent to one skilled in the art by reading the following specification and appended claims, and by referencing the following drawing(s), in which:

SUMMARY OF THE INVENTION

Figure 1:
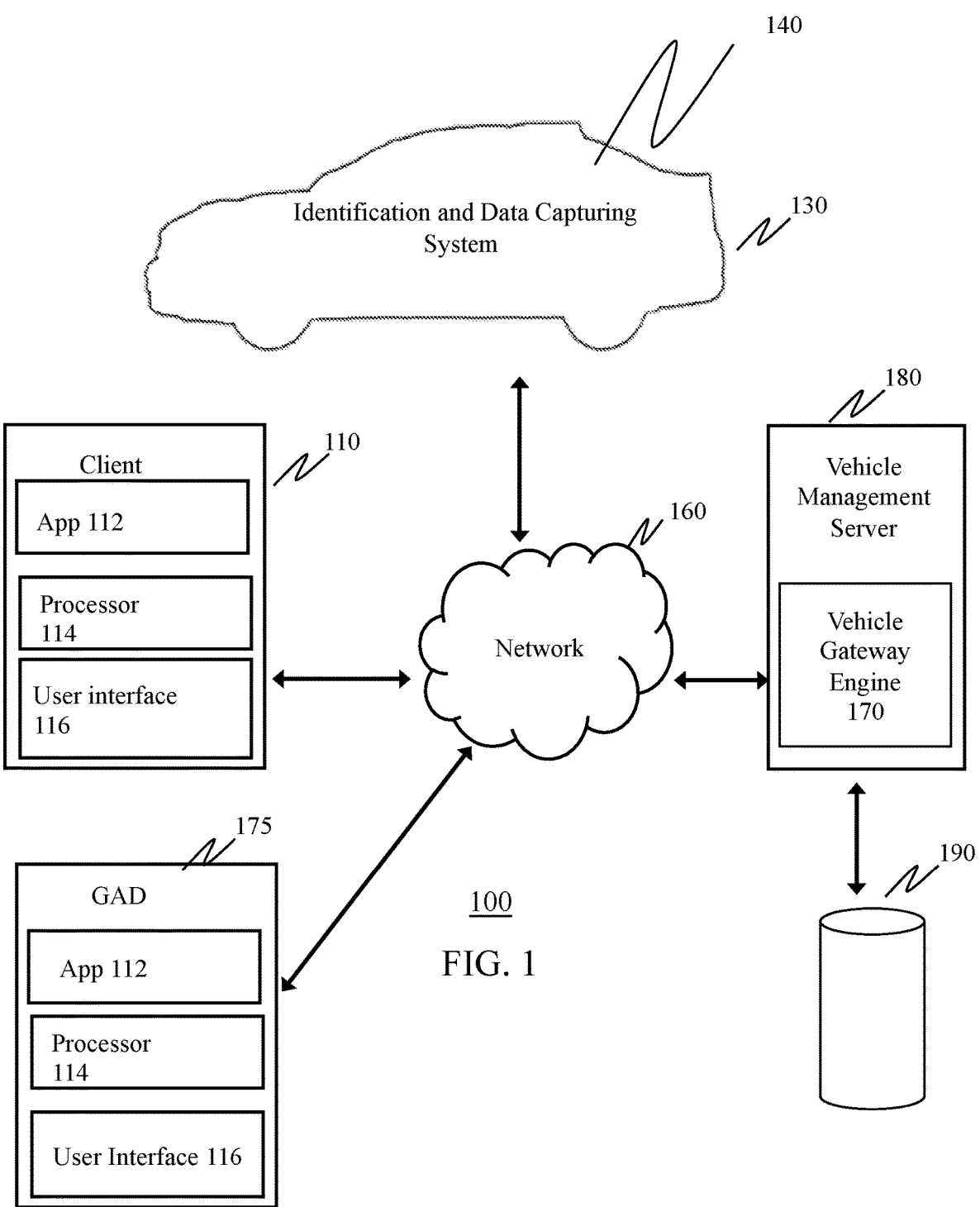
FIG. 1 depicts an illustrative architecture in which techniques and structures for providing the apparatus and methods disclosed herein may be implemented.

Exemplary embodiments disclosed herein describe an apparatus for providing real-time vehicle data capture and vehicle identification. The apparatus includes an identification and data capture system, a network, a vehicle management server, at least one guardian angel device and at least one data storage device. The identification and data capture system includes, a display device, a media recording unit, at least one trigger unit, at least one computer-readable storage media and at least one processor. The display device is configured on an external surface of a vehicle door. The media recording unit is configured to capture data in real-time. The at least one trigger unit is configured to initiate a real-time data capturing by the media recording unit. The at least one computer-readable storage media stores a guardian angel application which is executed by the at least one processor.

The vehicle management server includes one or more computer programs, one more processors and one or more computer-readable storage media. The vehicle management server is configured to create a profile for a user and store the profile in at least one profile database stored in the at least one data storage device, assign a unique account number to the user, assign storage space in the at least one data storage device to the user to store data associated with the user, link the unique account number to the storage space assigned to the user, receive data associated with the user from a real-time data capture session, broadcast the received real-time data to all guardian angel devices designated by the user, and store the received data in the storage space assigned to the user.

In some exemplary embodiments, the IDCS is further configured to send an alert notification to each guardian angel device designated by the user.

In some exemplary embodiments, the apparatus includes an internal vehicle display for displaying the real-time data captured by the at least one camera device.

In some exemplary embodiments, the external display device is an electronic display configured to display vehicle identification information.

In some exemplary embodiments, the external display device is integrated on the external surface of a driver-side vehicle door.

In some exemplary embodiments, the media recording unit includes at least one video recording device integrated within the vehicle at a front view, a left side view, a right side view, and a rear side view.

In some exemplary embodiments, the media recording unit includes at least one pair of video recording devices, each pair integrated within the vehicle at a front view, a left side view, a right side view, and a rear side view.

In some exemplary embodiments, each pair of video recording devices includes a rear-facing video recording device and a front-facing video recording device.

In some exemplary embodiments, each at least one video recording is configured to capture data within a user-selected field of view designated for the corresponding at least one camera.

In some exemplary embodiments, the trigger unit alerts the media recording unit when a trigger event occurs.

The apparatus of claim 1 wherein the trigger unit alerts the media recording unit when a trigger event occurs.

In some exemplary embodiments, the media recording unit activates the at least one video recording unit when a trigger event occurs.

In some exemplary embodiments, the media recording unit controls the operation of the at least one camera consistent with the user selected field of view.

In some exemplary embodiments, the trigger unit includes at least one of a push-button switch integrated into the dashboard of the vehicle, voice recognition technology, or Bluetooth™ technology.

Exemplary embodiments disclosed herein describe a method for providing real-time vehicle data capture and vehicle identification. The method includes receiving, by the IDCS, a trigger notification that a trigger event has occurred; alerting, by the IDCS, the at least one GAD and the VMS that a trigger event has occurred; activating, by the IDCS, a media recording unit to capture real-time data; transmitting, by the IDCS, the real-time captured data to the VMS; and broadcasting, by the VMS, the real-time captured data to the at least one GAD.

In some exemplary embodiments, the method includes activating, by the IDCS, an external display device to display vehicle identification information.

In some exemplary embodiments, the method includes creating, by the VMS, a user profile which includes at least one device designated as the GAD and at least one setting for the media recording unit.

In some exemplary embodiments, the method includes activating, by the IDCS, at least one video recording device in the media recording unit consistent with the at least user setting for the media recording unit to capture data in real-time.

In some exemplary embodiments, the method includes storing, by the VMS, the real-time captured data in at least one data storage device.

In some exemplary embodiments, the external display is integrated on an external surface of a vehicle.

DETAILED DESCRIPTION

The disclosed embodiments describe an apparatus for providing real-time vehicle data capture and vehicle identification. The apparatus includes a display device for displaying information on an external surface of a vehicle. The display device provides information associated with the vehicle, such as, for example, driver identification information, to individuals outside of the vehicle. The information provided may be useful for police officers, emergency workers, healthcare providers, etc. Moreover, the apparatus includes a media recording unit for capturing real-time data from inside and outside of the vehicle. The captured data may be useful in providing details surrounding an event. For example, the data may capture the details of a stop of the vehicle by a police officer. The captured data may be provided to a vehicle, one or more guardian angel devices, and a vehicle management server.

Turning now to the drawings, FIG. 1 depicts an illustrative architecture 100 in which techniques and structures of the present disclosure may be implemented. The illustrative architecture 100 may include at least one client device 110, at least one identification and data capture system ("IDCS") 140, a network 160, and at least one vehicle management server ("VMS") 180. The vehicle management server 180 includes at least one data storage device 190 and a vehicle gateway engine 170. In some aspects, the illustrative architecture may include at least one guardian angel device ("GAD") 175.

Although not shown, the illustrative architecture 100 includes one or more electronic communications channels for transmitting data between client device 110, identification and data capture system (IDCS) 140, network 160, guardian angel device (GAD) 175, vehicle management server (VMS) 180 and data storage device 190. While a limited number of client devices, IDCS, GADs, networks, VMS and data storage devices are illustrated, the apparatus may include any number of client devices, IDCS, GADs, networks, VMS and data storage devices.

The network 160 may include any one or a combination of multiple different types of networks, such as cable networks, the Internet, wireless networks, and other private and/or public networks. In some instances, the network 160 may include cellular, Wi-Fi, or Wi-Fi direct. The network may be the Internet or any other suitable network for the transmitting of data from a source to a destination.

The at least one client device 110 and the at least one GAD device 175 may include a mobile device, a tablet, a laptop device, a server, a personal desktop computer and/or a vehicle computer system. The client device 110 and GAD 175 are communicably coupled to network 160. It should be noted that other types of devices might be used with the present application. For example, a PDA, an MP3 player, or any other wireless device, a gaming device (such as a handheld system or home-based system), any computer wearable device, and the like (including a P.C. or other wired device) that may transmit and receive information may be used with the present application. In a preferred embodiment, the client device and the GAD are smart phones.

The client device 110 and GAD 175 may execute a user browser to interface with network 160, an email application used to send and receive emails, a text application used to send and receive text messages, and many other types of applications. Communication may occur between the client device 110, GAD 175 and network 160 via applications (e.g., app 112) executing on said devices (i.e., 110, 175) and the applications may be downloaded via an application store or may reside on the client device and GAD by default. Additionally, communication may occur on the client device and GAD using the client device's and GAD's operating system to perform the logic to communicate without the use of applications.

The client device 110 and GAD 175 may include one or more computer-readable storage media, one or more processors (e.g., 114) and one or more computer programs. One or more of the computer programs (e.g., guardian angel application 112) may include code that is used in a guardian angel platform. The guardian angel platform may include one or more processors and one or more computer programs. The guardian angel platform may operate (i.e., run/execute) on client device 110, GAD 175, IDCS 140 and VMS 180. Further, the guardian angel platform may include any one or more from the group comprising a web site, web browser, application programming interfaces, operating system, web application, cloud application, mobile application, and social media site.

The guardian angel platform allows a user to capture data in real-time for streaming, display or storage. The captured data may be transmitted to client device 110, IDCS 140, GAD 175 and VMS 180. Moreover, the guardian angel platform provides vehicle identification information to a display device on an external surface of a vehicle. The external display device allows individuals outside of the vehicle to obtain useful information from an occupant of the vehicle (e.g., the driver) without having to directly interact with the occupant. In some circumstances, the occupant may be incapacitated or injured and not able to provide the information. In other circumstances, the occupant may be afraid to lower the car window to interact with someone outside of the vehicle.

Client device 110 and GAD 175 may include a graphical user interface for displaying one or more user interfaces (e.g., 116) corresponding to app 112 (i.e., guardian angel application). At least one of the user interfaces may include a display screen where real-time captured data may be displayed. Another user interface may include a touchscreen trigger button to initiate a trigger function. In some aspects, the user interface may include a voice activated interface to initiate a trigger function. Another user interface may provide a screen that allows the user to register an account to use the guardian angel platform. The registered account may include profile settings, such as, for example, modes of activating a vehicle identification display (i.e., external display 147), turn-on GAD alert notifications and streaming, set-up storage options for captured data and trigger function options. The modes for activating a vehicle identification display may include a touchscreen activate button, an activate button (i.e., a push-button switch) integrated on the dashboard of a vehicle, and a voice activate interface. Another user interface may allow a user to provide the vehicle identification information which will be displayed on the external display device when activated.

Another user interface may allow a user to identify/designate one or more GADs 175 and one or more trigger function options. The identified one or more GADs are devices which are each associated with an individual or an entity, respectively, to which an alert notification should be sent, and real-time captured data should be streamed. Each identified GAD includes a phone number, email address, or other information which allows the platform to send communications and data to the device (i.e., GAD). An alert notification may be sent to all identified GADs when a trigger function occurs.

The trigger function options may include one or more modes for activating a trigger function, such as, for example, a touchscreen trigger button, a trigger button (e.g., a push-button switch) integrated on the dashboard of a vehicle, a motion sensor and a voice activated trigger interface. Another user interface may identify settings for the media recording unit, such as for example, number of active video recording devices, field of view for each active video recording device, mode(s) of activating each video recording device, etc.

Moreover, the client device 110 and GAD 175 may include a global positioning system ("GPS") for providing location information related to the client device and/or the GAD.

Figure 2:
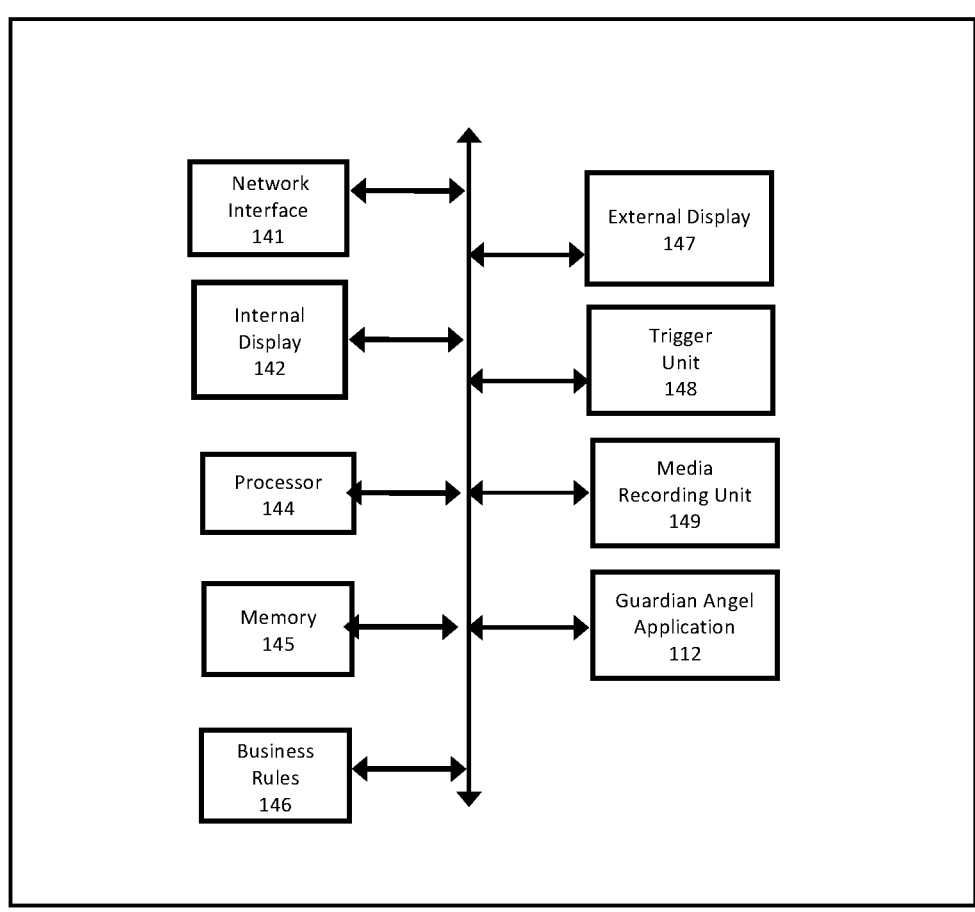
FIG. 2 illustrates an exemplary block diagram of an identification and data capturing system in a real-time vehicle data capture and vehicle identification apparatus according to an embodiment of the present disclosure.

Turning to FIG. 2, the at least one identification and data capture system ("IDCS") 140 may include at least one network interface 141, an internal display 142, at least one processor 144, at least one memory 145, business rules 146, and a guardian angel interface engine. The guardian angel interface engine may include at least on external display 147, at least one trigger unit 148, at least one media recording unit 149 and guardian angel application 112. The guardian angel application ("app 112") may be stored in the at least one memory 145 as computer executable instructions that are processed by the at least one processor 144. In some aspects, the IDCS may be installed in a vehicle (e.g., 130) and may be integrated with the on-board electronics of the vehicle.

The network interface 141 (i.e., interface to network 160) can be configured to send and receive data to/from client device(s) 110, GAD 175 and VMS 180. Moreover, the network interface may be configured to send and receive data internally to the IDCS (i.e., to/from internal display 142, external display 147, processor 144, trigger unit 148, and media recording unit 149. It should be understood that the network interface 141 may include any interface configured to deliver content to/from client device(s) 110, GAD 175, VMS 180 and internally within the IDCS. In embodiments, the network interface may include hardware/software that provides communications over networks, such as, for example, Wi-Fi, Zigbee, IoT, Bluetooth, Ethernet, Multimedia over Coax Alliance (MoCA), RF, etc.

Moreover, in some aspects, the network interface 141 can be configured to send/receive notifications to/from a client device 110, GAD 175, VMS 180 and internally within the IDCS. The notifications can include display notifications, alert notifications, trigger notifications, etc. The notifications can be sent/received using one or more communication protocols, including but not limited to, instant messaging, Short Message Service (SMS), email, push notifications, in-app messages and voice response system.

The internal display 142 is a digital/electronic display device and may be configured as an automotive head unit located in the dashboard or console of a vehicle. In some aspects, the internal display may include a mobile device or portable computing device (e.g., tablet). The internal display is configured to display one or more user interfaces of application 112 and real-time data captured by the media recording unit 149. Moreover, the internal display is configured to display content received from client device 110, GAD 175 and VMS 180.

The memory 145 (e.g., random access memory (RAM), non-volatile secondary storage, hard drive, a floppy drive, and a CD-ROM drive) may store guardian angel application 112, business rules 146, real-time captured data, user input data, user interface data, user operation settings, registered account information, profile settings/data, content received from client device 110, GAD 175, and VMS 180, computer executable instructions, etc. At least one processor 144 accesses the data in the memory and executes the computer executable instructions stored in the memory. The at least one processor uses business rules 146 to perform some of the functions of the guardian angel interface engine, such as, for example, trigger processing, which is performed by trigger unit 148, media recording processing which is performed by media recording unit 149 and guardian angel application 112.

The external display 147 may be configured on an external surface of a vehicle 130, such as, for example, the external surface of a driver's side door. In some aspects, the external display is an electronic display device including a display panel which is illuminated when the external display is activated. Moreover, the display panel will also display predetermined information (e.g., vehicle identification) when the external display is activated (i.e., when the external display receives a display activation signal from external display control unit 148).

The external display 147 may include a display panel which may be implemented by a variety of technologies, such as, for example, an array of light-emitting diodes (LEDs), an electronic paper (e-paper) display, an electroluminescent panel, or preferably, a liquid crystal display (LCD) panel. The display panel is controlled by electronic circuitry which is connected to the display panel through a wiring harness. The electronic circuitry includes a memory circuit for storing information to be displayed on the display panel, such as, for example, driver license information (e.g., driver's name, license number, the state, county, year and month of expiration, etc.), emergency contact information, etc.

The external display control unit may include a touchscreen activate button, an activate button (e.g., a push-button switch) integrated on the dashboard of a vehicle, a voice activate interface and an external display control module. The touchscreen activate button, activate button, and the voice activate interface may be manually activated by a user and upon activation, each of the touchscreen activate button, activate button, and the voice activate interface may send an external display activation signal to the external display control module. The external display control module contains instructions that when executed by the at least one processor 144 cause the processor to receive an external display activation signal and send the external display activation signal to the external display 147 to activate the external display.

Moreover, the external display control module contains instructions that when executed by the at least one processor 144 cause the processor send a retrieve vehicle identification alert to VMS 180, to receive vehicle identification information from the VMS, transmit the received vehicle identification information to the external display 147 and send signal to the external display to store the vehicle identification information in the external display's memory circuit.

The trigger unit 148 may include a touchscreen trigger button, a trigger button (e.g., a push-button switch) integrated on the dashboard of a vehicle, a voice activated trigger interface, a motion sensor and a trigger control module. The touchscreen trigger button, push-button trigger switch, and the voice activated trigger may be manually activated by a user and upon activation, each of the touchscreen trigger button, push-button trigger switch, and the voice activated trigger may send a trigger notification signal to the trigger control module. The motion sensor will automatically send a trigger notification signal to the trigger control module upon activation of the motion sensor. The motion sensor may be used, for example, to detect motion/activity around the outside perimeter of the vehicle when the vehicle is unoccupied.

The trigger control module contains instructions that when executed by the at least one processor 144 cause the processor to receive a trigger notification signal and send a data capture activation signal to the media recording unit 149. If the user has identified GAD 175 in its profile, then the processor will also send an alert notification to each GAD and send a broadcast alert to VMS 180. The broadcast alert will include the user's unique account number. In some aspects, the trigger control module may send the trigger notification signal to at least one GPS, which activates the GPS to send location information to at least one of the client device 110, GAD 175, IDCS 140, vehicle 130 and VMS 180.

The media recording unit 149 includes at least one video recording device and a media recording control unit module. The media recording unit captures real-time data from a specified or predetermined field of view. The field of view is adjustable and may be specified by a user. In some aspects, the field of view has a predetermined default setting. The field of view may include the inside region of a vehicle and the outside perimeter of the vehicle. The inside region of the vehicle may include a view of the front interior region (i.e., driver seat, front passenger seat, dashboard, windshield, etc.), and/or a view of the rear interior region (i.e., left rear passenger set, right rear passenger seat, rear window, etc.). The outside perimeter of the vehicle is the region within a range (e.g., 2 feet) anywhere along the outside perimeter of the vehicle.

The media recording unit 149 may include at least one video recording device integrated internally within a vehicle at a front view, a left side view, a right side view, and a rear side view. In some aspects, the at least one video recording device may be integrated externally on a vehicle at a front view, a left side view, a right side view, and a rear side view. In some aspects, the media recording unit includes at least one pair of video recording devices, each pair integrated within the vehicle at a front view, a left side view, a right side view, and a rear side view. In some aspects, the media recording unit includes at least one pair of video recording devices, each pair integrated externally on the vehicle at a front view, a left side view, a right side view, and a rear side view. Each pair of video recording devices includes a rear-facing video recording device and a front-facing video recording device. Each of the at least one video recording devices is configured to capture data within a field of view designated for the corresponding at least one video recording device.

Each video recording device upon activation captures data in real-time within the video recording device's field of view. Each video recording device may include a digital video recorder, a camcorder, a video camera, etc. Each video recording device may include a motion sensor and may capture data upon activation so long as motion is occurring. In other aspects, each video recording device may deactivate after a predetermined time period. In other aspects, the IDCS 140 or the guardian angel application 112 may include a mechanism which allows the user, the media recording control unit module or the VMS to deactivate the video recording device(s).

The media control unit module contains instructions that when executed by the at least one processor 144 cause the processor to receive a data capture activation signal from trigger unit 148, extract the user's settings for the media recording unit from client device 110, memory 145 or VMS 180, determine which video recording device(s) to activate based on the extracted user's settings, activate the determined video recording device(s) in accordance with the user's settings, receive data from the activated video recording device(s), transfer the received data to internal display 142, transfer the received data to VMS 180, and deactivate the activated video recording device(s).

Moreover, the at least one identification and data capture system ("IDCS") 140 may include a global positioning system ("GPS") for providing location information related to vehicle 130 and/or IDS 140.

In some aspects, the guardian angel platform may provide location information related to the client device 110, GAD 175, IDCS 140 or vehicle 130 upon the activation of a trigger or receipt of a trigger notification signal.

Figure 3:
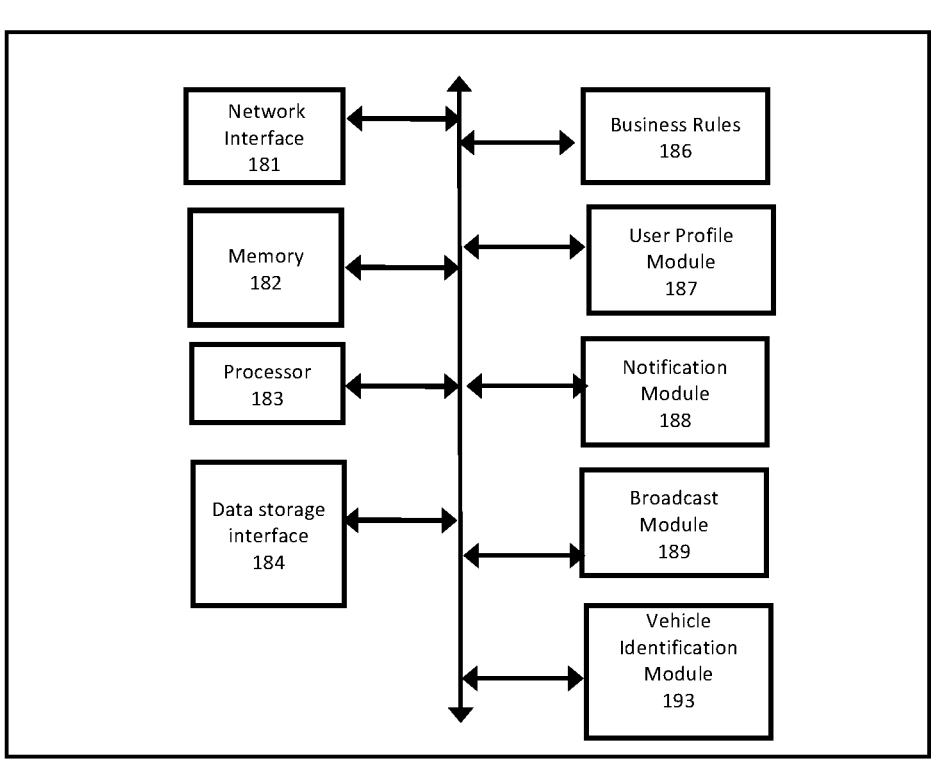
FIG. 3 illustrates an exemplary block diagram of a vehicle management server in a real-time vehicle data capture and vehicle identification apparatus according to an embodiment of the present disclosure.

Turning to FIG. 3, the vehicle management server includes a network interface 181, at least one memory 182, at least one processor 183, a data storage interface 184, business rules 186, user profile module 187, notification module 188, and broadcast module 189. The network interface 181 (i.e., interface to network 160 and data storage device 190) can be configured to send and receive data to/from client device(s) 110, GAD 175 and data storage device 180. It should be understood that the network interface 181 may include any interface configured to deliver content to/from client device(s) 110, GAD 175, and data storage device 190. In embodiments, the network interface may include hardware/software that provides communications over networks, such as, for example, Wi-Fi, Zigbee, IoT, Bluetooth, Ethernet, Multimedia over Coax Alliance (MoCA), RF, etc.

The memory 182 (e.g., random access memory (RAM), non-volatile secondary storage, hard drive, a floppy drive, and a CD-ROM drive) may store vehicle gateway engine 170, guardian angel application 112, business rules 186, real-time captured data, user input data, user interface data, user operation settings, registered account information, profile settings/data, content received from client device 110, GAD 175, and data storage device 190, GAD 175 information, computer executable instructions, etc. At least one processor 183 accesses the data in the memory and executes the computer executable instructions stored in the memory. The data storage interface 184 interfaces with at least one data storage device 190.

The vehicle gateway engine 170 includes one or more programs, one or more processors and one or more computer readable storage media, including at least one data storage device 190. The one or more computer programs are stored in the one or more computer-readable storage media. The one or more computer programs may comprise multiple hardware or software modules and contain program instructions that cause the one or more processors to perform various tasks, functions or features. At least one of the one or more processors (e.g., processor 183) uses business rules 186 to perform some of the functions of the vehicle gateway engine, such as, for example, user profile processing, which is performed by user profile module 187, notification processing which is performed by notification module 188 and broadcasting which is performed by broadcast module 189.

The at least one data storage device 190 may include a registered user account database, a vehicle identification database, a GAD database, a captured data database, a table, etc. The registered user account database stores profile information for registered users. The vehicle identification database stores vehicle identification information for each user. The GAD database stores each user's identified (i.e., designated) GADs 175. The captured data database stores data captured from IDCS 140. The table lists all registered users and an assigned corresponding unique account number for each user. The table links each user's unique account number to the user's vehicle identification information, GAD information and captured data information.

The vehicle management server 160 creates a profile for a new registered user, stores the profile in the register user account database, stores the user's vehicle identification information in the vehicle identification database, stores the user's GADs 175 in the GAD information database, stores the user's captured data in the captured data database, generates a table to link the user's unique account number to the storage location(s) in the registered user account database, vehicle identification database, GAD database and captured data database where the corresponding user's information is stored (i.e., assign storage space in the at least one data storage device to the user to store data associated with the user). Upon receipt of a broadcast alert from IDCS 140, the VMS will extract the corresponding user's GAD information from the GAD database and broadcast the received captured data to each GAD identified for the corresponding user. If the user's settings include a setting to store the captured data, then the captured data will also be stored in the captured data database.

The user profile module 187 contains instructions that when executed by the at least one processor 183 cause the processor to create a profile for a new registered user, store the profile in the register user account database, store the user's vehicle identification information in the vehicle identification database, store the user's GADs 175 in the GAD information database, generate a table to link the user's unique account number to the storage location(s) in the registered user account database, vehicle identification database, GAD database and captured data database where the corresponding user's information is stored.

The notification module 188 contains instructions that when executed by the at least one processor 183 cause the processor to receive a broadcast alert from the ICDS 140, extract the corresponding user's GAD information from the GAD database, and send an incoming stream alert to each GAD identified in the user's GAD information.

The broadcast module 189 contains instructions that when executed by the at least one processor 183 cause the processor to receive a broadcast alert from the ICDS 140, extract the corresponding user's GAD information from the GAD database and broadcast the received captured data to each GAD identified for the corresponding user. If the user's settings include a setting to store the captured data, then the captured data will also be stored in the captured data database.

The vehicle identification module 193, contains instructions that when executed by the at least one processor 183 cause the processor to receive a retrieve vehicle identification alert from IDCS 140, extract the corresponding user's vehicle identification information from the vehicle identification database, and transmit the vehicle identification information to the IDCS 140.

In other aspects, any information stored in the registered user account database may be retrieved from client device 110, GAD 175 or IDCS 140.

Figure 4:
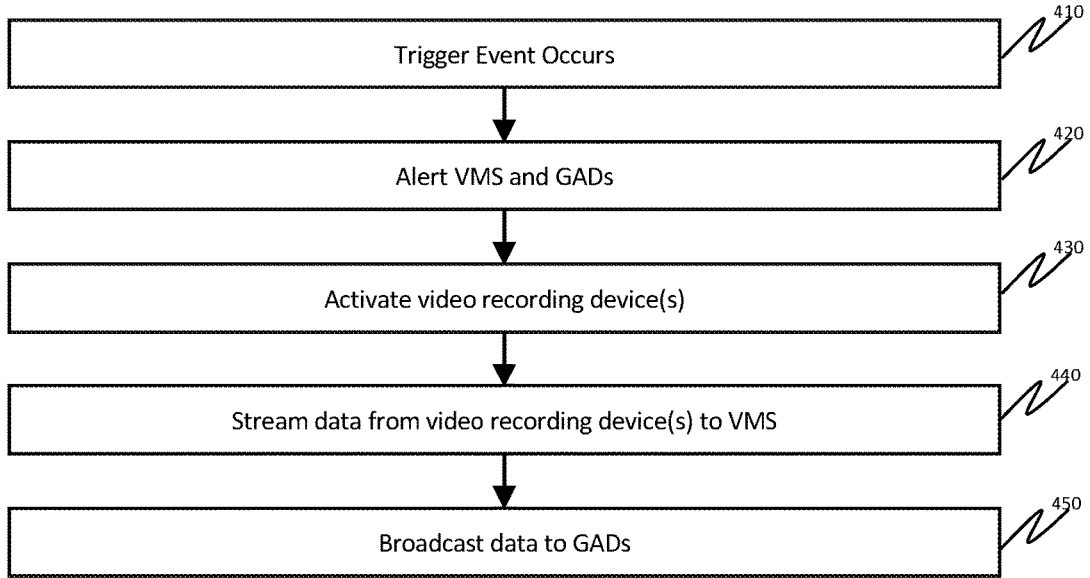
FIG. 4 illustrates an exemplary flow diagram of a method for providing real-time vehicle data capture according to an embodiment of the present disclosure.

FIG. 4 shows an exemplary high level flow diagram 400 of a method for providing real-time data capture according to an embodiment of the present disclosure. The method includes at step 410, a trigger event occurs, which causes an alert to be sent to VMS 180 and GADs 175, at step 420. Thereafter, one or more video recording devices are activated at step 430 for real-time data capture. The captured data is transmitted to VMS at step 440 and the VMS broadcasts the streamed data to each GAD designated by the user at step 450.

In operation, a user may download application 112 from a server (e.g., vehicle management server 180 or a mobile app store. Once the user launches the application 112, the user is prompted to register to use the guardian angel platform by creating an account. The vehicle management server 180 creates a profile for the user using the information provided by the user. The profile created for the user may also be stored on a client device 110. The profile may include identifying information for the user, media recording settings, trigger options, vehicle identification information, etc. The vehicle management server stores the user's profile in registered user account database which is stored in the at least one data storage device 190. Once the profile is setup, the vehicle management server 160 assigns a unique account number to the user and creates a virtual account for the user. The vehicle management server creates a table which lists all registered users and their unique corresponding account number. The table links each user's unique account number to the user's virtual storage space (i.e., the user's vehicle identification information, GAD information and captured data information). The table 175 may be stored in at least one data storage 190.

Figure 5:
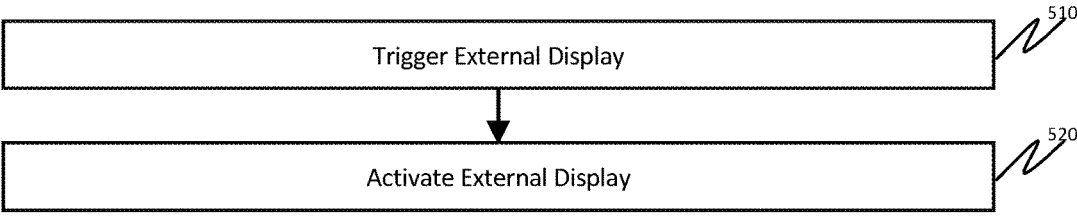
FIG. 5 illustrates an exemplary flow diagram of a method for providing vehicle identification according to an embodiment of the present disclosure.

FIG. 5 shows an exemplary high level flow diagram 500 of a method for providing vehicle identification according to an embodiment of the present disclosure. At step 510, a trigger occurs to activate the external display and at step 520, the external display is activated.

The computer programs contain program instructions that are converted to executable code. The executable code is committed to memory using machine codes selected from the specific machine language instruction set, or native instructions, designed into the hardware microprocessor. The hardware microprocessor is configured to perform a predefined set of logic operations in response to receiving a corresponding basic instruction selected from a predefined native instruction set of machine codes. Each native instruction is a discrete code that is recognized by the hardware microprocessor and that can specify particular registers for arithmetic, addressing, or control functions; particular memory locations or offsets; and particular addressing modes used to interpret operands. The program instructions are a set of machine codes that are selected from the native instruction set that are processed by the hardware microprocessor.

The present disclosure may be described in the general context of computer code or machine-useable instructions, including computer-executable instructions such as program modules, being executed by a computer or other machine, such as a personal data assistant or other handheld device. Generally, program modules include routines, programs, objects, components, data structures, etc., and refer to code that perform particular tasks or implement particular abstract data types. The present disclosed system 100 may be practiced in a variety of system configurations, including handheld devices, consumer electronics, more specialty computing devices, etc. The present disclosed system may also be practiced in distributed computing environments where tasks are performed by remote-processing devices that are linked through a communications network.

Computer-readable storage media include volatile and nonvolatile, removable and non-removable media implemented in any method or technology for storage of information such as computer-readable instructions, data structures, program modules or other data. Computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the any of the one or more processors. Computer storage media excludes signals per se.

Memory generally includes computer-readable storage media in the form of volatile and/or nonvolatile memory. The memory may be removable, non-removable, or a combination thereof. Exemplary hardware devices include solid-state memory, hard drives, optical-disc drives, etc. Processor is a hardware computing device and generally includes central processing unit, microprocessor, graphics processing unit, digital signal processor, application-specific instruction set processor (ASIP), machine-learning processor—a specialized microprocessor designed specifically for processing machine learning models, physics processing unit (PPU), image processor, coprocessor, floating-point unit, network processor, etc.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

The disclosed embodiments are not inclusive, and many other modifications and variations will be apparent to someone of ordinary skill in the art with construction skills in the related arts. Further, the steps of the disclosed methods can be modified in various manners, including by reordering steps, executing multiple steps concurrently, and/or inserting or deleting steps, without departing from the principles of the invention. Together the descriptions and accompanying illustrations seek to provide an explanation of the basic principles of the embodiment and its application. It is therefore intended that the specification and embodiments be considered as exemplary only.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus for providing real-time vehicle data capture and vehicle identification, the apparatus comprising:
   an identification and data capture system ("IDCS") including:
   a display device configured on an external surface of a vehicle door; a media recording unit for capturing data in real-time;
   at least one trigger unit for initiating real-time data capturing by the media recording unit; and
   at least one computer-readable storage media having stored therein a guardian angel application, and at least one processor for executing the guardian angel application;
   a network;
   at least one data storage device;
   a vehicle management server ("VMS") having one or more computer programs, one more processors and one or more computer-readable storage media, the server configured to:
   create a profile for a user and store the profile in at least one registered user account database stored in the at least one data storage device, the profile includes at least one guardian angel device ("GAD") designated by the user;

assign a unique account number to the user;

assign storage space in the at least one data storage device to the user to store data associated with the user;

link the unique account number to the storage space assigned to the user; receive data associated with the user from the IDCS;

broadcast the received real-time data to all guardian angel devices ("GADs") designated by the user; and storing the received data in the storage space assigned to the user.

2. The apparatus of claim 1 wherein the IDCS is further configured to:

send an alert notification to each guardian angel device designated by the user.

3. The apparatus of claim 1 further comprising an internal vehicle display for displaying the real-time data captured by the at least one camera device.

4. The apparatus of claim 1 wherein the external display device is an electronic display configured to display vehicle identification information.

5. The apparatus of claim 4 wherein the external display device is integrated on the external surface of a driver-side vehicle door.

6. The apparatus of claim 1 wherein the media recording unit includes at least one video recording device integrated within the vehicle at a front view, a left side view, a right side view, and a rear side view.

7. The apparatus of claim 1 wherein the media recording unit includes at least one pair of video recording devices, each pair integrated within the vehicle at a front view, a left side view, a right side view, and a rear side view.

8. The apparatus of claim 7 wherein each pair of video recording devices includes a rear-facing video recording device and a front-facing video recording device.

9. The apparatus of claim 6 wherein each at least one video recording device is configured to capture data within a user-selected field of view designated for the corresponding at least one camera.

10. The apparatus of claim 1 wherein the trigger unit alerts the media recording unit when a trigger event occurs.

11. The apparatus of claim 1 wherein the IDCS sends a notification to the VMS when a trigger event occurs.

12. The apparatus of claim 5 wherein the media recording unit activates the at least one video recording unit when a trigger event occurs.

13. The apparatus of claim 1 wherein the media recording unit controls the operation of the at least one camera consistent with the user selected field of view.

14. The apparatus of claim 1 wherein the trigger unit includes at least one of a push-button switch integrated into the dashboard of the vehicle, voice recognition technology, or Bluetooth™ technology.

* * * * *